US005249334A

United States Patent [19]

Hörberg et al.

[11] Patent Number: 5,249,334

[45] Date of Patent: Oct. 5, 1993

[54] HINGE FOR MOTOR VEHICLES

[75] Inventors: Arne Hörberg; Rolf Svensson, both of Olofström, Sweden

[73] Assignee: AB Volvo, Gothenburg, Sweden

[21] Appl. No.: 768,896

[22] PCT Filed: May 16, 1990

[86] PCT No.: PCT/SE90/00329

§ 371 Date: Oct. 28, 1991

§ 102(e) Date: Oct. 28, 1991

[87] PCT Pub. No.: WO90/14485

PCT Pub. Date: Nov. 29, 1990

[30] Foreign Application Priority Data

May 16, 1989 [SE] Sweden .............................. 8901740

[51] Int. Cl.[5] ......................... F16C 11/06; E05D 7/00

[52] U.S. Cl. ....................................... 16/224; 16/380; 16/DIG. 33; 16/264; 16/270; 384/206; 384/218; 403/132; 403/135

[58] Field of Search ................. 16/224, DIG. 33, 380, 16/264, 273, 270; 384/206, 209, 210, 211; 403/132, 133, 135, 140

[56] References Cited

U.S. PATENT DOCUMENTS

| | | | |
|---|---|---|---|
| 2,187,099 | 1/1940 | Rodemeyer | 16/224 |
| 3,305,617 | 2/1967 | Dumpis | 403/135 |
| 3,342,513 | 9/1967 | Melton et al. | 403/135 |
| 3,506,288 | 4/1970 | Gottschald | 403/135 |
| 4,629,352 | 12/1986 | Nemoto | 403/135 |
| 4,676,798 | 6/1987 | Noiles | 403/135 |

FOREIGN PATENT DOCUMENTS

| | | | |
|---|---|---|---|
| 3539276 | 1/1987 | Fed. Rep. of Germany . | |
| 2628951 | 4/1987 | Fed. Rep. of Germany . | |
| 557325 | 8/1923 | France . | |
| 1236910 | 6/1960 | France | 403/132 |
| 2445909 | 8/1980 | France . | |
| 441115 | 9/1985 | Sweden . | |
| 454819 | 10/1936 | United Kingdom | 16/224 |
| 459806 | 1/1937 | United Kingdom | 16/224 |
| 869191 | 5/1961 | United Kingdom | 16/224 |
| 1374261 | 11/1974 | United Kingdom . | |
| 1514380 | 6/1978 | United Kingdom . | |

*Primary Examiner*—Lowell A. Larson
*Assistant Examiner*—Donald M. Gurley
*Attorney, Agent, or Firm*—Young & Thompson

[57] ABSTRACT

A hinge for a door or hatch of a motor vehicle has two hinge halves (1, 2), one (1) of which has a pivot pin (6) and the other (2) of which has a bearing portion (9) pivotally mounted on the pivot pin (6). The pivot pin (6) has a spherical end portion (11), onto which the bearing portion (9) fits with a complementary shaped cavity, and a narrower neck portion (12). A lock (18) cooperates with the neck portion (12) of the pivot pin (6) and the bearing portion (9) to lock the hinge halves (1, 2) against relative movement in the axial direction of the pivot pin (6). The bearing portion (9) has a bearing sleeve (13) journalled on the pivot pin (6), including the complementary shaped cavity therein. A bearing housing (15) has an inside surface which fits over an outside surface of the bearing sleeve (13), and a fastener (16) detachably fastens the bearing sleeve (13) to the bearing housing (15).

4 Claims, 1 Drawing Sheet

HINGE FOR MOTOR VEHICLES

The invention relates to a hinge for a door or hatch, preferably for a motor vehicle, said hinge comprising two hinge halves, one of which is provided with a pivot pin and the other of which is provided with a bearing portion for pivot mounting on the pivot pin, said pivot pin having a spherical end portion, onto which the bearing portion fits with a complementary shaped cavity, and a narrower neck portion, a lock means being arranged to cooperate with the neck portion of the pivot pin and the bearing portion to lock said components against relative movement in the axial direction of the pivot pin.

The pivot pin in a door hinge, in a motor vehicle for example, is usually made as an essentially vertical, entirely circular cylindrical pin, which is fixed between a pair of mounting bracket arms, the bearing portion being a cylindrical sleeve surrounding the pin. The pin and the sleeve are mounted in their own mounting brackets, intended to be fixed to the door and the door post, respectively. The two hinge halves usually cannot be separated, which means that one hinge half must be detached from the door or the door post when the door is removed, and this means that when the door is remounted it must be realigned.

During body pre-assembly the doors are usually fitted and mounted, and during final assembly the doors are removed in order to mount the other door components, such as windows, locks etc., while the interior of the car is completed. It is therefore possible to save considerable time if one can avoid aligning the doors for a second time during final assembly.

Several different solutions have been presented, based on taking the hinge apart to avoid realignment or readjustment when the door is remounted, e.g. by removing one portion of a two-piece fixing plate or by removing a rotatable and lockable loose pin. This work is physically demanding and must be combined with manual fixtures to hold the door or the hatch in position prior to re-hanging or after removal.

The purpose of the present invention is to provide a hinge which makes it possible in an automatic process to remove and re-hang doors and hatches quickly and simply while retaining predetermined tolerances without requiring any manual steps in connection with this operation.

This is achieved according to the invention by virtue of the fact that the bearing portion comprises a bearing sleeve to be journalled on the pivot pin, a bearing housing, the inside of which fits over the outside of the bearing sleeve, and a fastener means for detachably fastening the bearing sleeve to the bearing housing.

The invention provides pivot mounting in the hinges without tension, which makes it possible during hanging or removal of the door to permit slightly non-parallel alignment of the upper and lower hinges. This permits an increased level of automation during assembly and the reduction of assembly time.

Figure 1:
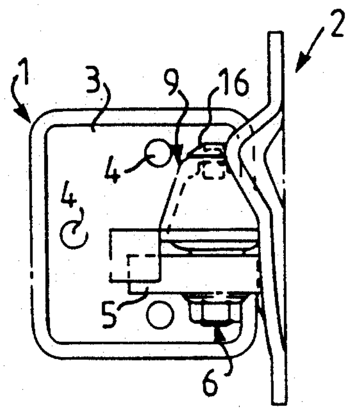
Figure 2:
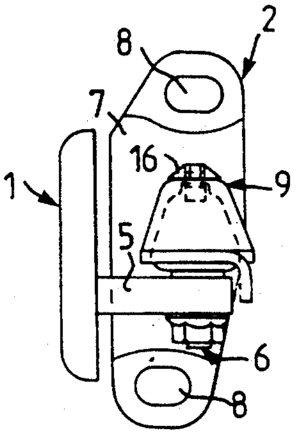
Figure 3:
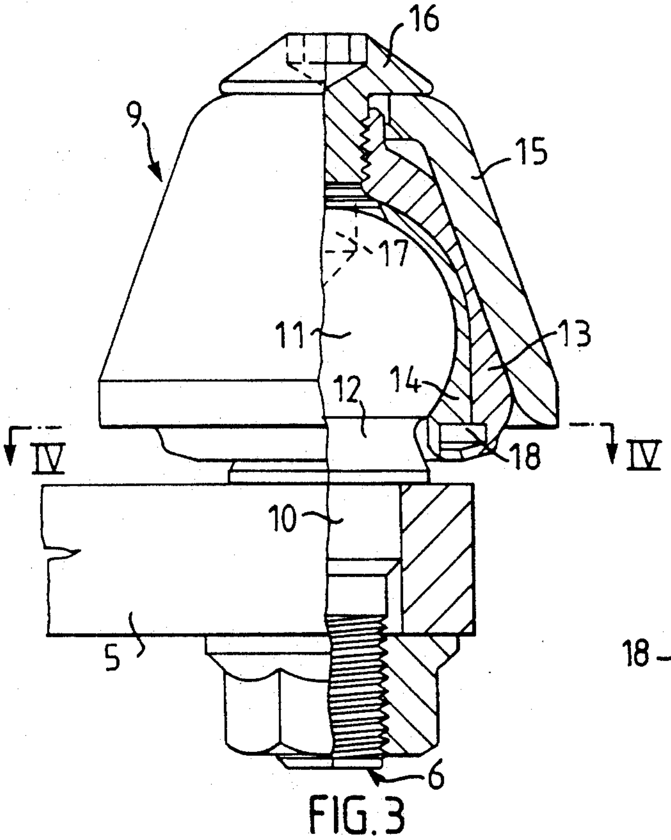
Figure 4:
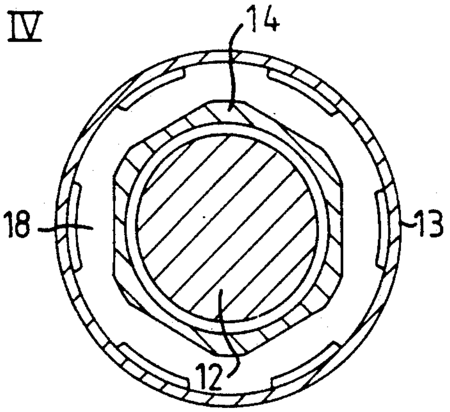

The invention will be described in more detail below with reference to the accompanying drawing, in which FIG. 1 is a side view of a hinge according to one embodiment of the invention, in the form of an upper hinge of a passenger car door, FIG. 2 is a view of the hinge in FIG. 1 as seen from the left in FIG. 1, FIG. 3 is a partially cut-away side view of a portion of the hinge in FIG. 1 on a larger scale, and FIG. 4 shows a section along the line IV—IV in FIG. 3.

The hinge shown in the drawing essentially consists of a first hinge half 1 and a second hinge half 2, which are designed to be mounted on a door post and a door, respectively. The first hinge half 1 comprises a mounting plate 3, consisting of two pressed sheet metal parts welded together and provided with screw holes 4 for mounting screws, and an essentially horizontal supporting arm 5 into which a pivot pin 6 with an essentially vertical longitudinal axis is securely screwed. The second hinge half 2 comprises a mounting plate 7 with screw holes 8 for mounting screws and a bearing portion 9 for pivot mounting on the pivot pin 6. The bearing portion 9 is welded to the mounting plate 7.

As can be seen in FIG. 3, the pivot pin 6 has a cylindrical fastener portion 10 for mounting in the supporting arm 5 and a spherical end portion 11 as well as a neck portion 12 between the fastener portion 10 and the end portion 11. The diameter of the neck portion 12 is smaller than the largest diameter of the spherical end portion 11.

The bearing portion 9 comprises a bearing sleeve 13 which can be arranged to be journalled directly on the spherical end portion 11 of the pivot pin 6, but in the embodiment shown it is journalled on the end portion 11 via a bearing shell 14 which will be described in more detail below. Outside the bearing sleeve 13 there is a bearing housing 15, the inside surface of which fits over the outside of the bearing sleeve 13. In the embodiment shown, the outside of the bearing sleeve 13 and the inside of the bearing housing 15 have a truncated conical shape, but other shapes are conceivable provided that they achieve a precisely determined relative position between the bearing housing 15 and the bearing sleeve 13 when in a mounted position.

The bearing housing 15 is provided at its narrow end with a flat surface with a through-hole, through which a fastener means 16 in the form of a screw extends. The underside of the head of the screw 16 abuts against the outside of the bearing housing 15 and the screw is screwed into a threaded hole in the bearing sleeve 13. In this manner, the fastener means or screw 16 holds the bearing housing 15 and the bearing sleeve 13 together. As indicated in the drawing, there is also a cavity 17 in the end portion of the pivot pin 6. If the fastener means 16 is replaced by a fastener means with an extension, this extension can extend into the cavity 17 and thus fix the predetermined position of the bearing portion 9 on the pivot pin 6. This is an advantage in the first hanging of the door on the vehicle. When re-mounting the door, the fastener or screw 16 without an extension is used.

The bearing shell 14 is spherical on its inside and is in close contact with the spherical end portion of the pivot pin 6. As is revealed particularly well in FIG. 3, a portion of the bearing shell 14 extends past the portion of the pivot pin 6 with largest diameter and down towards the neck portion 12 of the pivot pin 6. The bearing shell 14 thus interlocks with the spherical end portion 11 of the pivot pin 6. In order to simplify mounting of the bearing shell 14 on the pivot pin 6, the bearing shell 14 is provided with at least one slot which extends from that end of the bearing shell 14 which is adjacent the neck portion 12 of the pivot pin 6 at least to the portion of the pivot pin 6 with greatest diameter. The outside of the bearing shell 14 is spherical down to the portion of the pivot pin 6 with greatest diameter, and from there it is cylindrical down to the neck portion 12. The inside of the bearing sleeve 13 is shaped to fit the outside of the bearing shell 14.

At the end of the bearing sleeve 13 and the bearing shell 14 lying adjacent to the neck portion 12, there is a lock washer 18 which extends under the lower edge of the bearing shell 14. The lower portion of the bearing sleeve 13 is folded around the lock washer 18 in order to thus lock the bearing shell 14 against movement relative to the bearing sleeve 13.

During the first mounting of the hinge, the fastener means 16 shown in the drawing is replaced by a fastener means with an extension which extends into the cavity 17 in the pivot pin 6 in order to thus fix the two hinge halves 1 and 2 in a predetermined position relative to each other. The hinge halves 1 and 2 are mounted, after the door has been fitted in place, on the door post and the door, respectively. The hinge shown in the drawing is thus intended to serve as an upper hinge for a car door, and the lower hinge is assumed to be of generally the same design. Stop means, springs and the like which car doors are usually equipped with have been left out here to more clearly illustrate the actual invention.

If subsequent operations make it necessary to remove the door from the vehicle, this can be done simply by removing the fastener means 16 or the corresponding fastener means with an extension, whereafter the hinge half 2 together with the bearing housing 15 can be simply removed. When remounting the door, the complementary surfaces of the bearing sleeve 13 and the bearing housing 15 will reassume their precisely determined position, and they are fixed in place with the aid of the fastener means 16 without an extension protruding into the cavity 17. In the embodiment described of the hinge according to the invention, an industrial robot can be used both for taking off the door and for remounting the same.

We claim:

1. In a hinge for a door or hatch of a motor vehicle, said hinge comprising two hinge halves (1, 2), one (1) of which is provided with a pivot pin (6) and the other (2) of which is provided with a bearing portion (9) pivotally mounted on the pivot pin (6), said pivot pin (6) having a spherical end portion (11), onto which the bearing portion (9) fits with a complementary shaped cavity, and a narrower neck portion (12), a lock means (18) being arranged to cooperate with the neck portion (12) of the pivot pin (6) and the bearing portion (9) to lock said hinge halves (1, 2) against relative movement in the axial direction of the pivot pin (6); the improvement wherein the bearing portion (9) comprises a bearing sleeve (13) journalled on the pivot pin (6) and including said complementary shaped cavity therein, a bearing housing (15), an inside surface of which fits over an outside surface of the bearing sleeve (13), and a fastener means (16) detachably fastening the bearing sleeve (13) to the bearing housing (15), the inside surface of the bearing housing (15) and the outside surface of the bearing sleeve (13) being formed as complementary truncated conical surfaces, there being a bearing shell (14) between the pivot pin (6) and the bearing sleeve (13), an inside surface of the bearing shell (14) being spherical and having a portion extending past a portion of the bearing pin (6) of greatest diameter, an outside surface of the bearing shell (14) being spherical down to a portion of the pivot pin (6) of greatest diameter and from there is cylindrical in the direction towards the neck portion (12) of the pivot pin (6), and the inside surface of the bearing sleeve (13) being made to correspond to the outside surface of the bearing shell (14).

2. Hinge according to claim 1, wherein the bearing shell (14) is provided with at least one slot which extends from that end of the bearing shell adjacent the neck portion (12) of the pivot pin (6) to the portion of the bearing shell adjacent the portion of the pivot pin (6) of greatest diameter.

3. Hinge according to claim 1, wherein the fastener means consists of a screw (16) threaded in a threaded hole in the bearing sleeve (13) and having its head abut against the outside surface of the bearing housing (15).

4. Hinge according to claim 3, wherein the pivot pin (6) is made with a cavity (17) into which an extension of the fastener means (16) can protrude for relative locking of the hinge halves (1, 2) in a predetermined position.

* * * * *